United States Patent
Graucob

(10) Patent No.: US 10,900,372 B2
(45) Date of Patent: Jan. 26, 2021

(54) DEVICE FOR STORING ENERGY BY ELECTRICAL ENERGY BY MEANS OF CONVERSION OF ELECTRICAL ENERGY INTO THERMAL ENERGY

(71) Applicant: Heinrich Graucob, Schwarmstedt (DE)

(72) Inventor: Heinrich Graucob, Schwarmstedt (DE)

(*) Notice: Subject to any disclaimer, the term of this patent is extended or adjusted under 35 U.S.C. 154(b) by 0 days.

(21) Appl. No.: 16/390,369

(22) Filed: Apr. 22, 2019

(65) Prior Publication Data

US 2019/0323374 A1 Oct. 24, 2019

(30) Foreign Application Priority Data

Apr. 24, 2018 (DE) .......................... 10 2018 109 846

(51) Int. Cl.
| | | |
|---|---|---|
| *F01D 15/10* | (2006.01) | |
| *H02K 7/18* | (2006.01) | |
| *F01K 3/18* | (2006.01) | |

(52) U.S. Cl.
CPC .............. *F01D 15/10* (2013.01); *F01K 3/186* (2013.01); *H02K 7/1823* (2013.01); *F05D 2210/12* (2013.01); *F05D 2220/31* (2013.01); *F05D 2260/20* (2013.01)

(58) Field of Classification Search
CPC .................................. F01D 15/10; F01K 3/186
USPC ......................... 290/2; 60/641.8, 659; 165/10
See application file for complete search history.

(56) References Cited

U.S. PATENT DOCUMENTS

| 3,998,695 | A | * | 12/1976 | Cahn | ......................... F01K 3/06 376/322 |
| 4,003,786 | A | * | 1/1977 | Cahn | ....................... F01K 7/345 376/322 |
| 4,071,079 | A | * | 1/1978 | Engelbrecht | .............. F22B 1/06 122/32 |
| 4,361,009 | A | * | 11/1982 | Schluderberg | ............ F01K 3/00 165/104.15 |
| 4,455,835 | A | * | 6/1984 | Durrant | ..................... F01K 3/00 60/659 |
| 4,520,862 | A | * | 6/1985 | Helmbold | ........... F28D 20/0056 165/10 |
| 5,623,986 | A | * | 4/1997 | Wiggs | ..................... F24T 10/15 165/45 |
| 5,694,515 | A | * | 12/1997 | Goswami | .............. F24H 7/0433 392/480 |
| 5,816,314 | A | * | 10/1998 | Wiggs | ..................... F24T 10/15 165/45 |
| 6,286,316 | B1 | * | 9/2001 | Waldrop | .............. B01D 5/0039 60/659 |
| 6,701,914 | B2 | * | 3/2004 | Schwarz | ............. F28D 20/0052 126/400 |

(Continued)

FOREIGN PATENT DOCUMENTS

| DE | 102006044789 A1 | 3/2008 |
| DE | 102013016077 A1 | 4/2015 |

*Primary Examiner* — Pedro J Cuevas
(74) *Attorney, Agent, or Firm* — W & C IP

(57) ABSTRACT

A method and a device for storing electrical energy by means of conversion into thermal energy and reconversion into electrical energy are described. In a pipe system as a vapor container, there is produced overheated vapor by use of electrically produced heat, said vapor transmits in turn the heat to the walls of the walls of the vapor container (1) under-utilization a thermodynamic effect, said walls transmitting the heat to the storage medium (2) by use of additionally arranged welded plates.

23 Claims, 4 Drawing Sheets

(56) References Cited

U.S. PATENT DOCUMENTS

Figure 1:
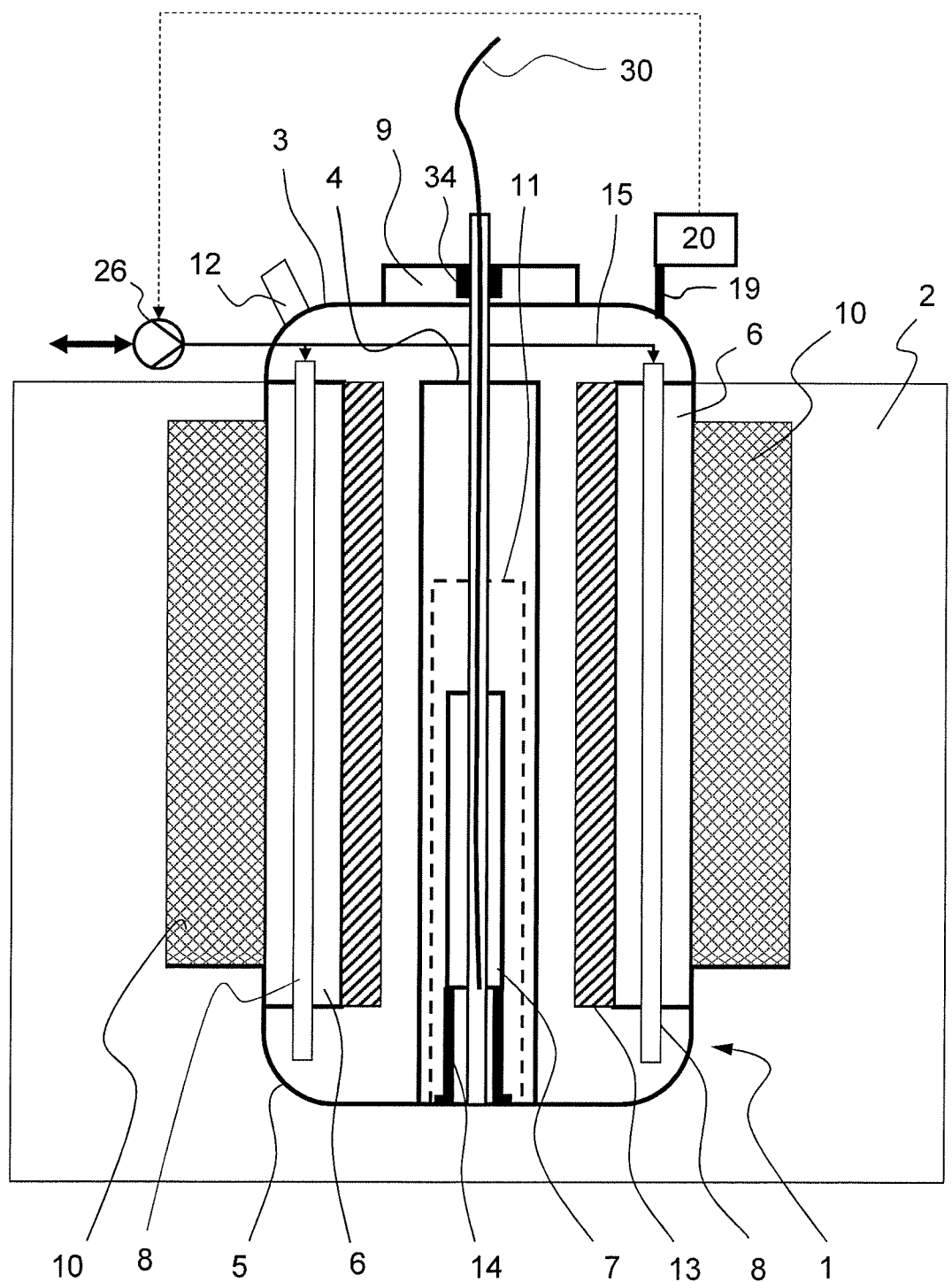

| | | | | |
|---|---|---|---|---|
| 6,789,608 B1* | 9/2004 | Wiggs | | F24T 10/15 |
| | | | | 165/45 |
| 6,957,536 B2* | 10/2005 | Litwin | | F03G 6/064 |
| | | | | 60/641.8 |
| 7,191,597 B2* | 3/2007 | Goldman | | F01K 13/00 |
| | | | | 60/641.8 |
| 7,296,410 B2* | 11/2007 | Litwin | | F03G 6/065 |
| | | | | 60/641.12 |
| 7,640,746 B2* | 1/2010 | Skowronski | | F01K 3/18 |
| | | | | 60/641.8 |
| 7,723,858 B2* | 5/2010 | Nayef | | F01K 1/12 |
| | | | | 290/2 |
| 7,877,999 B2* | 2/2011 | Nuel | | F02G 1/043 |
| | | | | 60/398 |
| 7,954,321 B2* | 6/2011 | Shinnar | | F03G 6/04 |
| | | | | 60/641.8 |
| 8,464,535 B2* | 6/2013 | White | | F01K 3/08 |
| | | | | 60/659 |
| 8,656,712 B2* | 2/2014 | Howes | | F01K 3/12 |
| | | | | 60/515 |
| 8,826,664 B2* | 9/2014 | Howes | | F01K 3/12 |
| | | | | 60/659 |
| 8,931,276 B2* | 1/2015 | Kim | | F24F 5/0046 |
| | | | | 60/641.8 |
| 8,955,320 B2* | 2/2015 | Xiang | | F28D 20/0056 |
| | | | | 60/641.8 |
| 9,534,508 B2* | 1/2017 | Brunhuber | | F01K 3/12 |
| 10,060,298 B2* | 8/2018 | Takahashi | | F01K 13/02 |
| 10,066,556 B2 | 9/2018 | Ward | | |
| 10,767,935 B2* | 9/2020 | Bergan | | F02C 3/305 |
| 2002/0053418 A1* | 5/2002 | Hirano | | F28D 20/0056 |
| | | | | 165/10 |
| 2005/0126172 A1* | 6/2005 | Hudson | | F28D 20/0056 |
| | | | | 60/659 |
| 2007/0220889 A1* | 9/2007 | Nayef | | F24H 7/0433 |
| | | | | 60/652 |
| 2008/0016866 A1* | 1/2008 | Mohr | | F28D 20/0056 |
| | | | | 60/649 |
| 2008/0022683 A1* | 1/2008 | Ohler | | F03D 9/18 |
| | | | | 60/641.8 |
| 2008/0219651 A1* | 9/2008 | Nayef | | F28D 20/0056 |
| | | | | 392/485 |
| 2010/0199975 A1* | 8/2010 | Bailey | | F24D 11/004 |
| | | | | 126/617 |
| 2011/0017196 A1* | 1/2011 | Bell | | F28D 17/02 |
| | | | | 126/400 |
| 2011/0100586 A1* | 5/2011 | Yang | | F28D 20/0034 |
| | | | | 165/45 |
| 2011/0100587 A1* | 5/2011 | Yang | | F28D 20/0052 |
| | | | | 165/45 |
| 2011/0247354 A1* | 10/2011 | Asai | | F24F 5/0046 |
| | | | | 62/324.6 |
| 2011/0277470 A1* | 11/2011 | Benyaminy | | F28D 20/02 |
| | | | | 60/641.8 |
| 2012/0055661 A1* | 3/2012 | Feher | | F28D 20/021 |
| | | | | 165/181 |
| 2012/0241122 A1* | 9/2012 | Xiang | | C09K 5/04 |
| | | | | 165/10 |
| 2012/0285442 A1* | 11/2012 | Hung | | F24S 23/71 |
| | | | | 126/620 |
| 2013/0111904 A1* | 5/2013 | Stiesdal | | F02C 6/14 |
| | | | | 60/659 |
| 2013/0153169 A1* | 6/2013 | Perryman | | F28D 20/021 |
| | | | | 165/10 |
| 2014/0284021 A1* | 9/2014 | Laurberg | | F01K 3/12 |
| | | | | 165/10 |
| 2016/0320145 A1* | 11/2016 | Bergan | | B23P 15/26 |
| 2018/0003445 A1* | 1/2018 | Bergan | | F28D 20/00 |
| 2018/0245485 A1* | 8/2018 | Conlon | | F01K 13/02 |
| 2020/0149825 A1* | 5/2020 | Liu | | F28D 13/00 |
| 2020/0232345 A1* | 7/2020 | Zwinkels | | F01K 3/14 |

\* cited by examiner

DEVICE FOR STORING ENERGY BY ELECTRICAL ENERGY BY MEANS OF CONVERSION OF ELECTRICAL ENERGY INTO THERMAL ENERGY

There is proposed:

An installation and a method for storing electrical energy in the form of heat in such a manner that in a pipe construction acting as a vapor container water is converted by means of electrically operated thermal elements into depressurized overheated vapor, which then, as a result of a thermodynamic effect, discharges thermal energy by distributing to the outer walls of the pipes of the vapor container to a storage medium in which the vapor container is embedded. The removal of the thermal energy from the vapor container is carried out by means of controlled input of water into the vapor container, wherein removal of overheated vapor is taken into account and, as a result of reduced pressure which is produced by means of an exhaust vapor condenser and the overheated vapor is guided through a heat exchanger combination. Water is then introduced into the heat exchanger in the second circuit and is then supplied as overheated vapor but at full pressure to a turbine with a generator in order to produce electrical energy.

DESCRIPTION OF THE INSTALLATION

The vapor container 1 (FIG. 1) has a lenticular upper and lower portion.

There is located therebetween a pipe construction which is securely welded to the lower side of the upper portion 3 and to the upper side of the lower portion 5 comprising the central pipe 4 (FIG. 1) and the preferably eight satellite pipes 6 (FIG. 1). This construction of the vapor containers 1 (FIG. 1) is embedded in the storage medium 2 which is intended to be heated (FIG. 1). Preferably, construction sand having the grain size 1-3 mm is proposed for this purpose. It is proposed to insulate the storage medium 2 at all sides and also with respect to the substrate. The upper portion 3 should be insulated separately in conventional vessel insulation in order to be able to approach the construction, in particular the plug-in heater 7.

Figure 4:
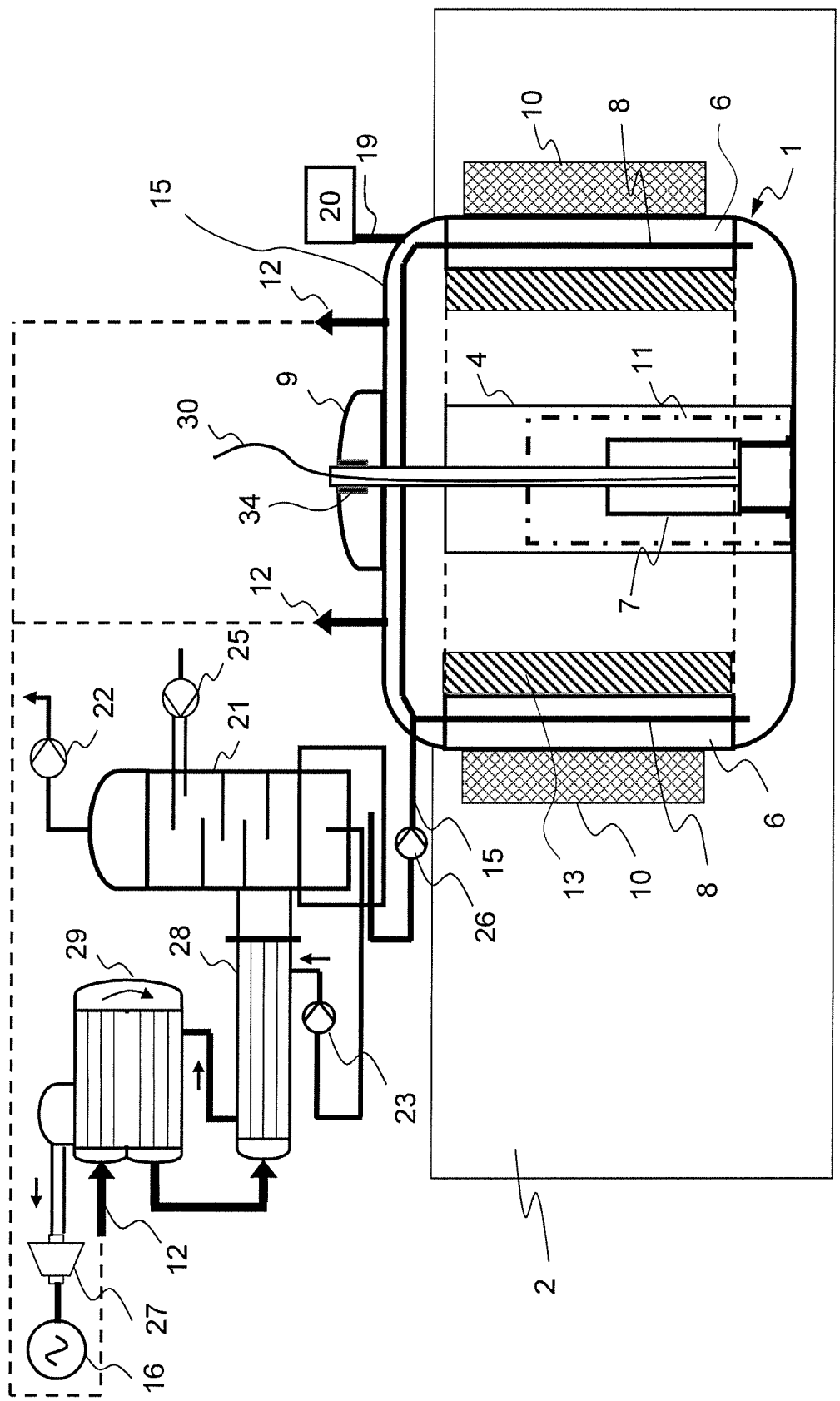

In the central pipe 4 there is arranged a plug-in heater 7 which rests loosely on the base of the lower portion 5. The upper portion of the plug-in heater 7 is guided as a pipe in a streamlined manner through the cover 9 (FIGS. 1 and 4).

The sealing is carried out by means of a stuffing box 34 (FIG. 1) with asbestos/graphite as a sealing agent. The plug-in heater 7 can thus expand without endangering the construction.

Various thermal elements 14 are located in this plug-in heater 7 in a distributed manner (FIG. 1). These elements are highly heat-resistant and reach temperatures of up to 1000 degrees Celsius. There is further provision for the central pipe 4 to be protected against the high temperature of the plug-in heater 7 by means of a loosely suspended pipe 11 between the plug-in heater 7 and the central pipe 4. The proposed, for example, eight satellite pipes 6 are provided at the inner side with redirection pipes in order to as a result of the turbulence of the transfer medium, overheated vapor, achieve a better heat transfer (not illustrated).

Figure 2:
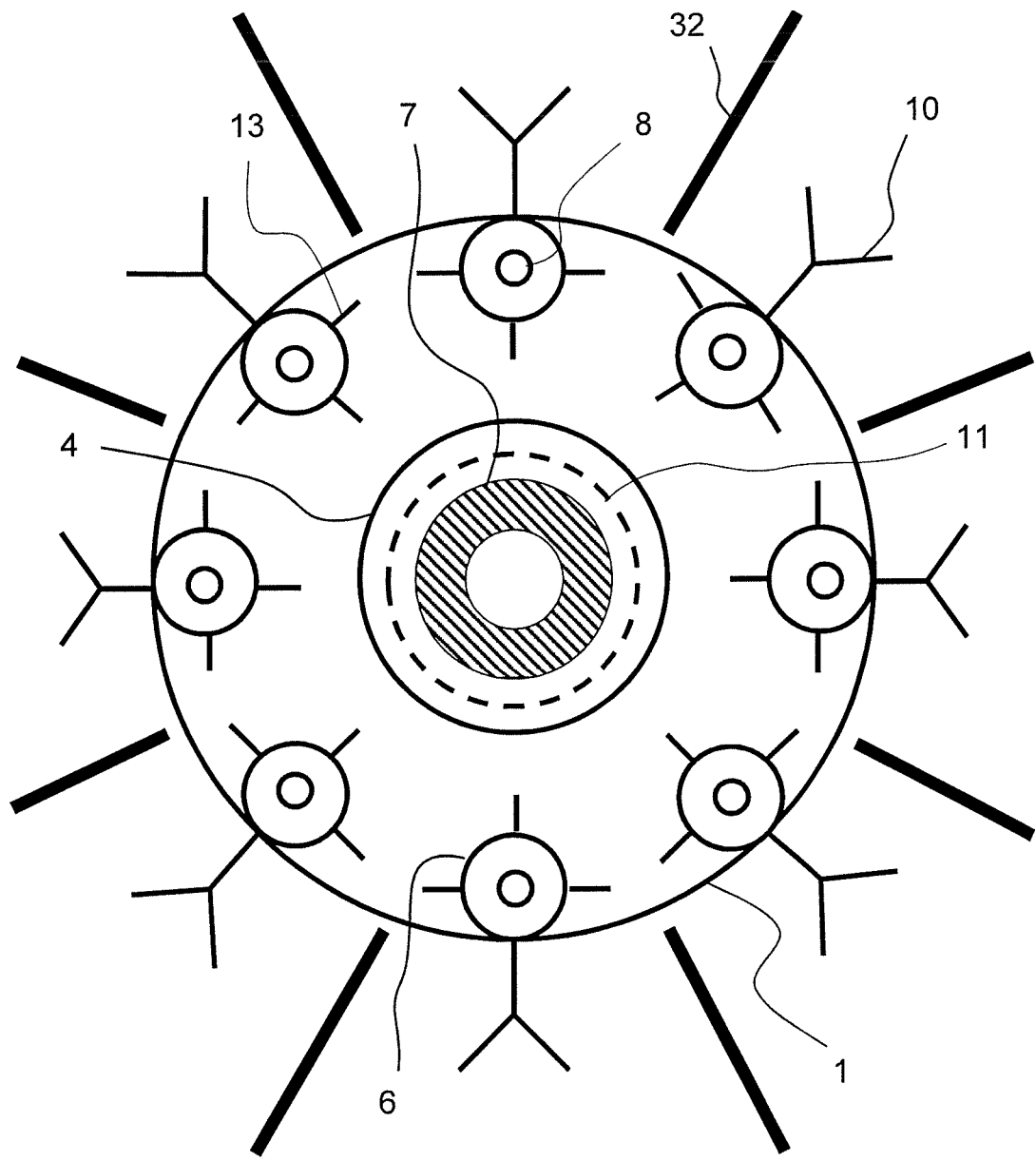

These pipes 6 are further provided at the outer side with perpendicular splayed metal plates 10 (FIG. 2).

In order to achieve a better heat transfer in the storage medium 2 to the outer side (horizontally), it is proposed to install horizontally jet-like outwardly arranged round bars 32 (FIG. 2) of ribbed TOR steel in stages in the storage medium 2. At the top on the upper portion 3 there are two pipe sockets 19 which lead outward into the free space. On one of these pipe sockets 19 a mechanically/electronically acting control fitting 20 is provided.

This control fitting 20 (FIG. 1) is intended to control the water input into the vapor vessel in such a manner that the pressure of the vapor which is produced even when it is removed via the pipeline 12 (FIGS. 1 and 4) remains almost unpressurized and without any pressure reduction. Another pipe 19 (FIGS. 1 and 4) is also provided for reasons of redundancy for safety.

For the mentioned water input there are provided in each of the eight satellite pipes 6 a respective water supply pipe 8 (FIG. 1). These pipes extend perpendicularly from above through the upper portion 3 in the center of these pipes. They are suspended loosely only in a state retained at the top and extend as far as the lower portion 5.

Figure 3:
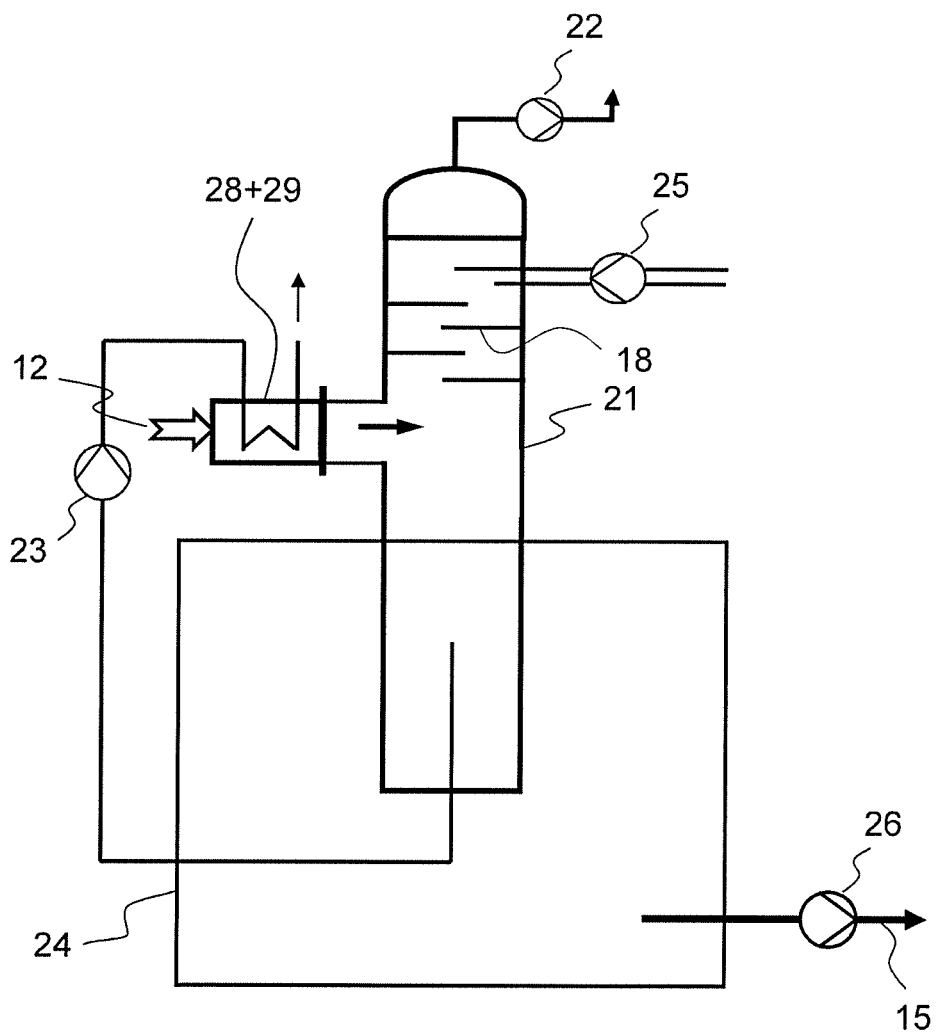

These pipes are connected to each other and are supplied by a pump 26 (FIG. 1) via the pipeline 15 with hot water from the exhaust vapor water container 24 (FIG. 3).

This pump 26 (FIG. 1) can also be used by switching the supply lines as a suction pump if the vapor container 1 (FIG. 1) has to be emptied occasionally. From the upper portion 3 (FIG. 1) a pipeline 12 (FIG. 1) leads to a dual-action heat exchanger 29, from there to another heat exchanger 28 (FIG. 4) which is directly fitted to the exhaust vapor condenser 21.

From the container 24, a pipeline having a pump 23 leads to the heat exchanger 28 and further to the dual-action heat exchanger 29. The pump 23 (FIG. 4) has a quantity control which controls the water level in the heat exchanger 29.

From the heat exchanger 29 a vapor line then leads to a turbine with a generator 27. The water supply of the heat exchangers 28 and 29 (FIG. 4) in order to produce overheated vapor is carried out by the pump 23 (FIG. 4) from the containers 21 (FIG. 4).

The container 24 receives an overflow in the form of a T so that there is no suction action.

The exhaust vapor condenser 21 has internally a cascade arrangement 18 to the uppermost terrace of which a water line 25 leads. A vacuum pump 22 (FIGS. 3 and 4) draws air from the exhaust vapor condenser 21.

The turbine 25 may also be provided with an exhaust vapor condenser 21 with a separate water flow and remote removal of the warm water.

Function of the Installation

A. Storing the Energy:

The plug-in heater 7 is connected to the energy network via the line 19. Initially, only the lower portion of the plug-in heater 7 is heated. The base of the plug-in heater 7 which is located loosely on the base of the lower portion 5 evaporates water which remains at that location or which is introduced via the line 8. The vapor rises through the central pipe 4 and the satellite pipes 8 and urges the air via the exhaust vapor pipes 12, 19. The plug-in heater 7 is switched to full power. The thermodynamic heating of the vapor container begins. Vapor heated by the plug-in heater 7 is discharged, becomes overheated vapor, flows into the upper portion 3 and then into the eight satellite pipes 6 into the lower portion 5 in order to from there reach the central pipe 4 again in order to be reheated again by the plug-in heater 7.

As a result of redirection plates in the satellite pipes 6, the overheated vapor transmits its energy to the outer walls of the satellite pipes 6 then to the splayed metal plates 10 (FIG. 2) and consequently to the storage medium 2. Round steels 21 (FIG. 2) which have been inserted increase the energy transmission. The system is thus heated to increasingly high temperatures. In this instance, the overheated vapor expands, but there is no increase of the pressure since the volume which now becomes more excessive escapes through the exhaust vapor pipe 19 into the open air.

The temperature of the medium increases as a result of the thermal energy which is introduced. As the temperature increases, the mass of the vapor becomes smaller and consequently so does the energy transmission.

The energy transmission also terminates when the temperature of the overheated vapor exceeds the limit temperature of the thermal elements and they are switched off.

B. Energy Recovery.

The following is carried out:

The water level regulation in the heat exchangers 28 and 29 is switched on (FIG. 4). The pump 23 (FIG. 3) conveys, where necessary, water for the second vapor circuit from the container 24.

The vacuum pump 22 (FIG. 4) produces a reduced pressure which extends over the heat exchangers 28 and 29 via the pipeline 12 as far as the vapor container 1.

The control unit 20 of the water pump 26 reports reduced pressure—the pump 26 begins to convey water from the container 21 into the circular pipeline 15 to the pipes 8 in the satellite pipes 6.

The pump 26 is subsequently controlled by the mechanical/electronic control unit 20 in terms of the quantity of water to be introduced in such a manner that in the vapor container 1 there is neither excess pressure nor reduced pressure. The water which is introduced evaporates and this vapor is overheated by the high temperature in the vapor container 1 and is then drawn in by the reduced pressure as far as the exhaust vapor condenser 21 (FIGS. 3 and 4). In this instance, residual vapor still remaining is condensed by the water droplets in the cascade arrangement 18 (FIG. 3). The overheated vapor now heats the water which is present in the heat exchangers 28 and 29 in the lower half and which becomes vapor in order to then be converted in the upper half of the heat exchanger 28 to overheated vapor—but now at high pressure. This overheated vapor is then supplied to the turbine 27 with a generator 16.

As a result of the different occurrence of energy, during the discharge operation it is proposed to operate the turbine 27 at the same pressure but with a different quantity. The turbine 27 adapts to the quantity via its speed.

The braking frequency of the converter is controlled via the pressure of the overheated vapor.

The invention claimed is:

1. A device for storing energy by conversion of electrical energy into thermal energy, comprising:
    a vapor container;
    a storage medium coupled to the vapor container;
    a water pipe adapted to guide water into the vapor container;
    a pump connected to the water pipe;
    an electrically driven plug-in heater arranged in the vapor container to electrically produce overheated vapor from water guided into the vapor container;
    a central pipe arranged in the vapor container, the central pipe surrounding the plug-in heater and comprising a vapor outlet at an upper end and an inlet at a lower end; and
    exhaust vapor pipes connected to the vapor container, wherein the overheated vapor produced by the plug-in heater circulates within the central pipe to the vapor outlet and outside the central pipe back to the inlet, wherein a thermodynamic effect transmits heat to the storage medium.

2. The device as claimed in claim 1, wherein the exhaust vapor pipes on the vapor container are arranged to keep the overheated vapor produced in the vapor container in a depressurized state.

3. The device as claimed in claim 1 wherein the plug-in heater comprises heat-resistant thermal elements.

4. The device as claimed in claim 1 wherein the plug-in heater is an inductive heater arranged for converting e€-electrical energy into thermal energy by induction.

5. The device as claimed in claim 1 wherein the storage medium is arranged at an outer wall of the vapor container.

6. The device according to claim 5 further comprising splayed metal plates on the outer wall of the vapor container, wherein the splayed metal plates are arranged for transmitting heat to the storage medium.

7. The device as claimed in claim 1 wherein the plug-in heater is removable in one piece from the vapor container.

8. The device as claimed in claim 1 further comprising a control unit arranged for switching off the plug-in heater when a preset temperature limit is exceeded.

9. The device as claimed in claim 1 further comprising a control unit arranged for switching off the plug-in heater when the heat transfer decreases as a result of the overheated vapor becoming smaller in terms of mass as the temperature increases.

10. The device as claimed in claim 1 further comprising
    a heat exchanger assembly,
    an exhaust vapor condenser,
    a vacuum pump in fluid connection to the vapor container, and
    a control unit configured for
        controlling the pump in order to introduce water into the vapor container at a beginning of a process of energy recovery from said storage medium, and
        first drawing air with the vacuum pump from the vapor container, and then drawing freshly forming vapor through the heat exchanger assembly into the exhaust vapor condenser.

11. The device as claimed in claim 10 wherein the control unit is arranged for controlling a quantity of the water introduced into the vapor container in such a manner that, even when air or vapor is drawn off through the exhaust vapor condenser, neither excess pressure nor reduced pressure is produced.

12. The device as claimed in claim 10, wherein said exhaust vapor condenser comprises a terraced cascade arrangement configured to condense a remainder of overheated vapor by applying water on the terraced cascade arrangement in order to achieve a volume reduction of the vapor and consequently drawing additional vapor from the vapor container through the heat exchanger assembly.

13. The device as claimed in claim 10 wherein the control unit is arranged to control the vacuum pump so as to continue running at low power during a discharge operation.

14. The device as claimed in claim 10 further comprising a turbine in fluid connection with the heat exchanger assembly, said device being arranged to compensate for different quantities of vapor with an operating pressure remaining almost equal by changing a speed of the turbine.

15. A method for storing energy by conversion of electrical energy into thermal energy, comprising:
    producing overheated vapor from water in a vapor container using an electrically driven plug-in heater;
    circulating the overheated vapor out a vapor outlet and into a vapor inlet of a central pipe arranged in the vapor container and which surrounds the electrically driven plug-in heater;

transmitting heat to a storage medium using a thermodynamic effect produced during the circulating step; and storing thermal energy with the storage medium from the heat transmitted in the transmitting step.

16. The method of claim 15 further comprising maintaining the overheated vapor in the vapor container in a depressurized state.

17. The method of claim 15 further comprising re-converting the thermal energy stored in the storage medium to electrical energy.

18. The method of claim 15 wherein transmitting heat is performed using metal plates on a wall of the vapor container.

19. The method of claim 15 wherein the electrically driven plug-in heater is an inductive heater.

20. The method of claim 15 further comprising the step of using a controller to selectively turn on and off the electrically driven plug-in heater.

21. The method of claim 15 further comprising the step of using a controller to selectively adjust a speed of a turbine to control pressure in the vapor container.

22. An exhaust vapor condenser comprising
a condenser vessel,
a first vapor inlet to the condenser vessel,
a first water inlet connected to a water line, wherein a water pump is in fluid connection to the water line,
a terraced cascade arrangement configured to condense vapor by applying water through the water inlet on the terraced cascade arrangement in order to achieve a volume reduction of the vapor, and
a vacuum pump in fluid connection to the condenser vessel.

23. The exhaust vapor condenser of claim 22, further comprising a heat exchanger assembly, said heat exchanger assembly comprising
a primary circuit having a second vapor inlet and a first vapor outlet, wherein the first vapor outlet of the heat exchanger assembly is connected to the first vapor inlet of the condenser vessel, and
a secondary circuit comprising a second water inlet and a second vapor outlet, said secondary circuit being arranged in opposite fluid direction to the primary circuit.

* * * * *